United States Patent
Toh et al.

(10) Patent No.: US 8,366,848 B2
(45) Date of Patent: Feb. 5, 2013

(54) THICK DOPED ADHESIVE TAPE TO ENHANCE BACKSCATTER X-RAY DETECTABILITY

(75) Inventors: Chin H. Toh, Orange, CA (US); James E. Engel, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 13/174,911

(22) Filed: Jul. 1, 2011

(65) Prior Publication Data
US 2013/0000814 A1    Jan. 3, 2013

(51) Int. Cl.
*B32B 41/00*    (2006.01)
(52) U.S. Cl. ............ 156/64; 156/60; 156/247; 156/378; 156/379; 156/702; 378/86; 378/87
(58) Field of Classification Search .................. 156/60, 156/64, 378, 379, 247, 702; 378/86, 87
See application file for complete search history.

(56) References Cited

U.S. PATENT DOCUMENTS

| | | | |
|---|---|---|---|
| 5,116,676 A | | 5/1992 | Winslow |
| 5,181,234 A | | 1/1993 | Smith |
| 7,189,793 B2 * | | 3/2007 | Wang et al. ................ 156/330.9 |
| 7,553,386 B2 * | | 6/2009 | Lu et al. .......................... 156/64 |
| 2010/0316458 A1 * | | 12/2010 | Lindgren et al. ................ 409/79 |

OTHER PUBLICATIONS

"Backscatter X-ray" Wikipedia: http://en.wikipedia.org/wiki/Backscatter_X-ray; accessed Jun. 9, 2011.
"Medical radiography" Wikipedia: http://en.wikipedia.org/wiki/Medical_radiography; accessed Jun. 1, 2011.
"Crepe paper" Wikipedia: http://en.wikipedia.org/wiki/Cr%C3%AApe_paper; accessed Jun. 1, 2011.
"Paper" Wikipedia: http://en.wikipedia.org/wiki/Paper; accessed Jun. 1, 2011.
3M; "ScotchBlue™ Painters Masking Tape for Multi-Surfaces 2090-3A-BK, 3 in×60 yd Blue Bulk Case"; http://solutions.3m.com/wps/portal/3M/en_US/Health/Safety/Products/Related/?PC_7_RJH9U52300A9E023IJD0G3O74_nid=1FCHLXMVF4gs651JNCZ61CgIP105NVF43Pbl; Accessed Jun. 1, 2011.

\* cited by examiner

*Primary Examiner* — Katarzyna Wyrozebski Lee
*Assistant Examiner* — Joshel Rivera
(74) *Attorney, Agent, or Firm* — Hope Baldauff Hartman, LLC

(57) ABSTRACT

Doped adhesive tape is used during the manufacture of aircraft, including positioning marks, covering orifices from debris, allowing locations to be marked. Any doped adhesive tape inadvertently left in sub-assemblies during the manufacturing process can be detected using backscatter X-ray inspection technology. Detection is facilitated in one embodiment by making the tape thicker, to produce an increased mass density, and in another embodiment by adding a dopant comprising an element that is readily detected by the backscatter X-ray technology. The element can be iodine, and can be incorporated into the backing layer or the adhesive layer of the tape during manufacturing. The use of both thicker tape and a dopant can be used in combination to facilitate detection. If the doped adhesive tape is detected after components are assembled using a backscatter X-ray inspection device, then the doped adhesive tape is removed.

6 Claims, 5 Drawing Sheets

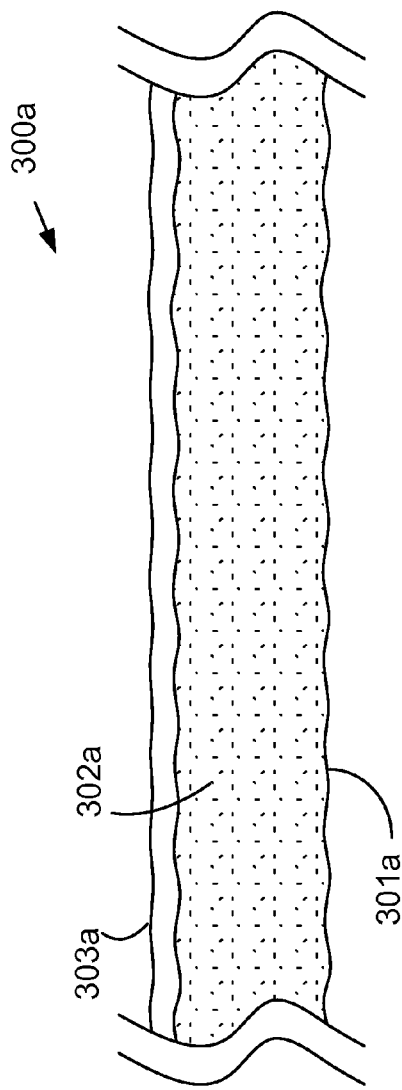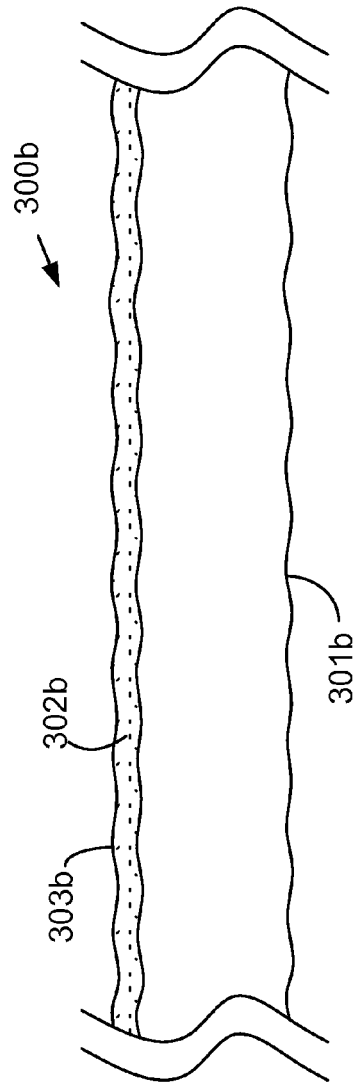
FIG. 3A
FIG. 3B

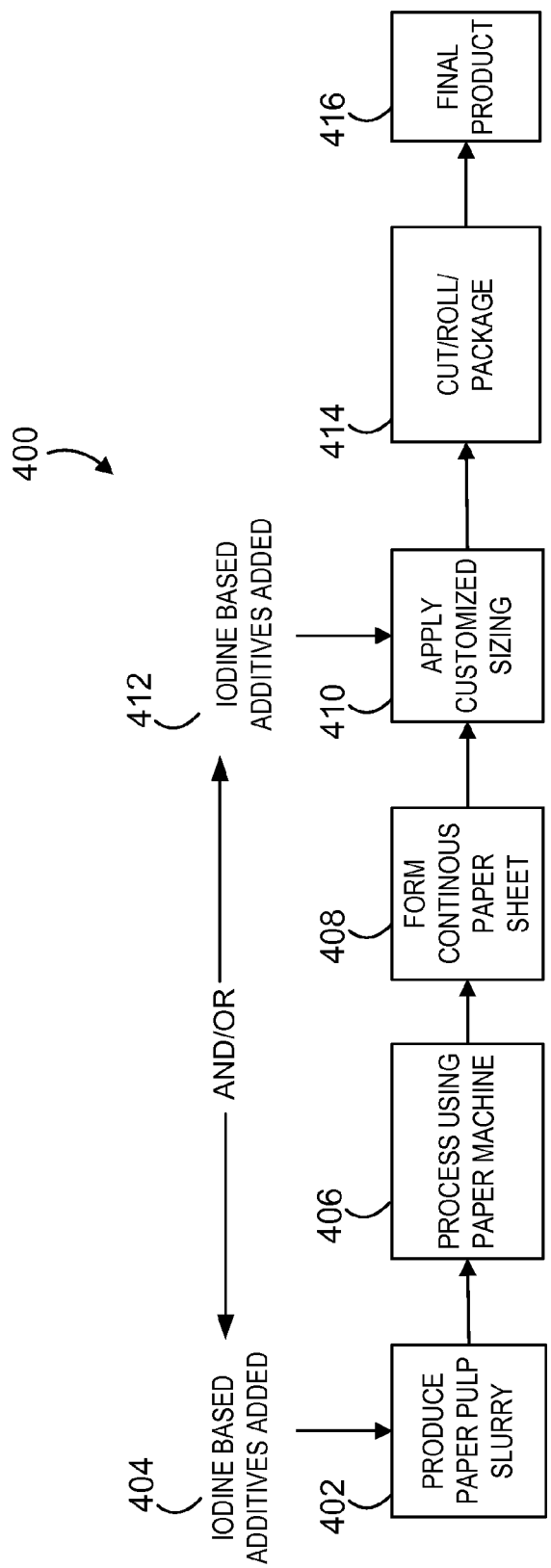

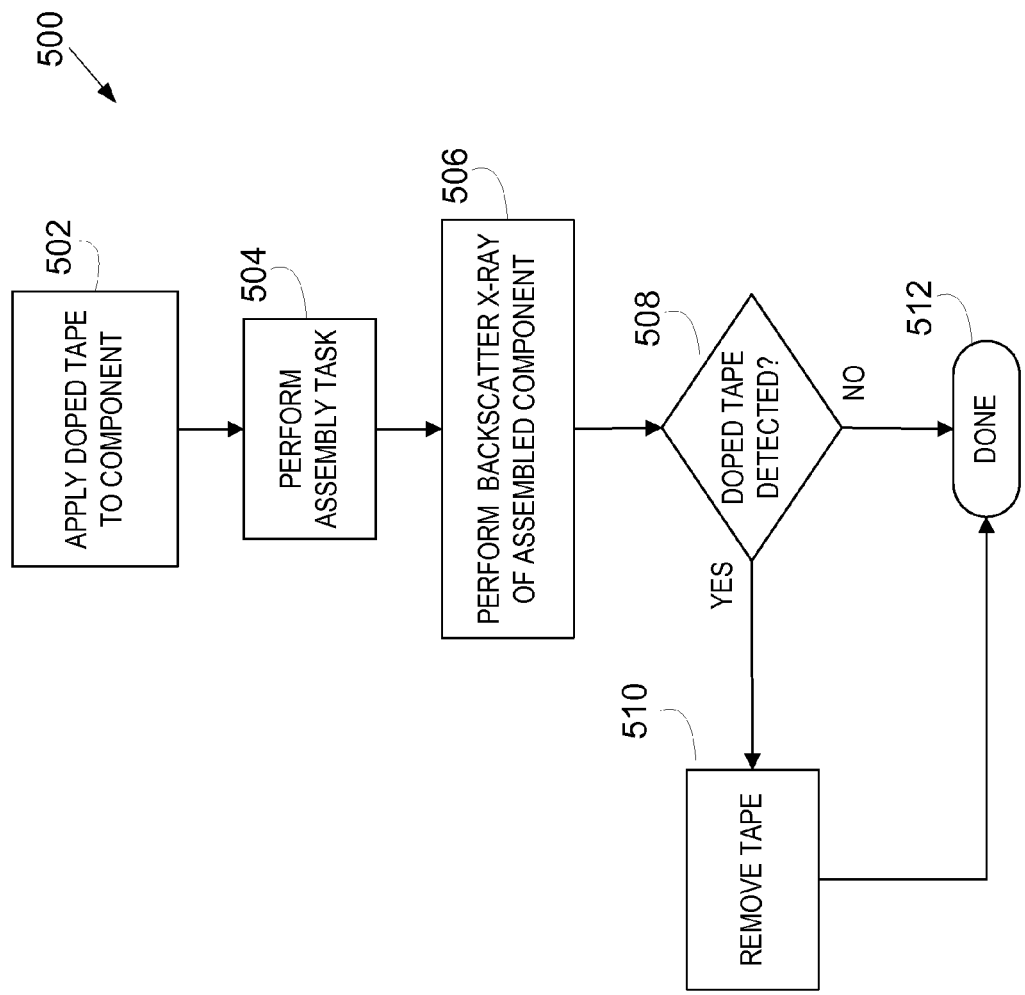

THICK DOPED ADHESIVE TAPE TO ENHANCE BACKSCATTER X-RAY DETECTABILITY

BACKGROUND

Manufacturing aircraft is a largely manual process, involving assembly of components into an airframe. Components are manually fitted, attached, and assembled by technicians on an assembly line. While in some instances, jigs and other devices are used to facilitate the assembly process, many of the procedures require manually measuring, positioning, and attaching components. One supply material that has been found useful in the manufacturing process is a commonly available adhesive tape, frequently referred to as "painter's tape." This type of tape has an adhesive applied to one side allowing the tape to be easily and cleanly removed. Specifically, the adhesive allows the tape to be removed without leaving behind adhesive residue on the component, and with minimal pullout of the surface material to which it is attached. Such tapes are readily available in home improvement stores or painting supply stores.

This tape is used for a variety of applications during the manufacturing process, including positioning parts together during the assembly. The applications of using this tape during assembly are numerous, and hence many pieces of tape are used during assembly of an aircraft. After assembly, the tape should be removed and discarded. However, it is possible some pieces of tape remain, and the tape becomes a "foreign object" left behind after the aircraft is assembled. This is undesirable for various reasons.

Therefore, it is important to be able to detect and remove all vestiges of any adhesive tape used during the assembly process. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment of the present disclosure, a doped adhesive tape includes a backing layer and an adhesive layer, where a dopant is added to the backing layer or the adhesive layer. The dopant is an element that facilitates detection of the doped adhesive tape using a backscatter X-ray inspection process.

In another embodiment of the present disclosure, a method of manufacturing the doped adhesive tape includes the operations of producing a paper slurry for manufacturing the adhesive tape, forming a continuous paper sheet using the paper slurry, and applying an adhesive sizing to the continuous paper sheet. A dopant is added during the manufacturing process that facilitates detection of the adhesive tape by a backscatter X-ray inspection process. The continuous paper sheet with adhesive and dopant is then formed into a roll of adhesive tape.

In another embodiment of the present disclosure, a method for using doped adhesive tape includes operations of applying the doped adhesive tape to a first component being assembled, where the doped adhesive tape includes a dopant facilitating detection of the doped adhesive tape by a backscatter X-ray inspection process. The first component is assembled with a second component, and the assembly is subjected to the backscatter X-ray inspection process.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIGS. 3A and 3B illustrate various embodiments of a thick doped adhesive tape for use in the assembly process according to various embodiments described herein.

FIG. 4. illustrates one embodiment of a manufacturing process flow for manufacturing thick doped adhesive tape according to various embodiments described herein.

FIG. 5 illustrates one process flow for detecting remnants of thick doped adhesive tape after assembly of components according to various embodiments described herein.

DETAILED DESCRIPTION

Figure 1:
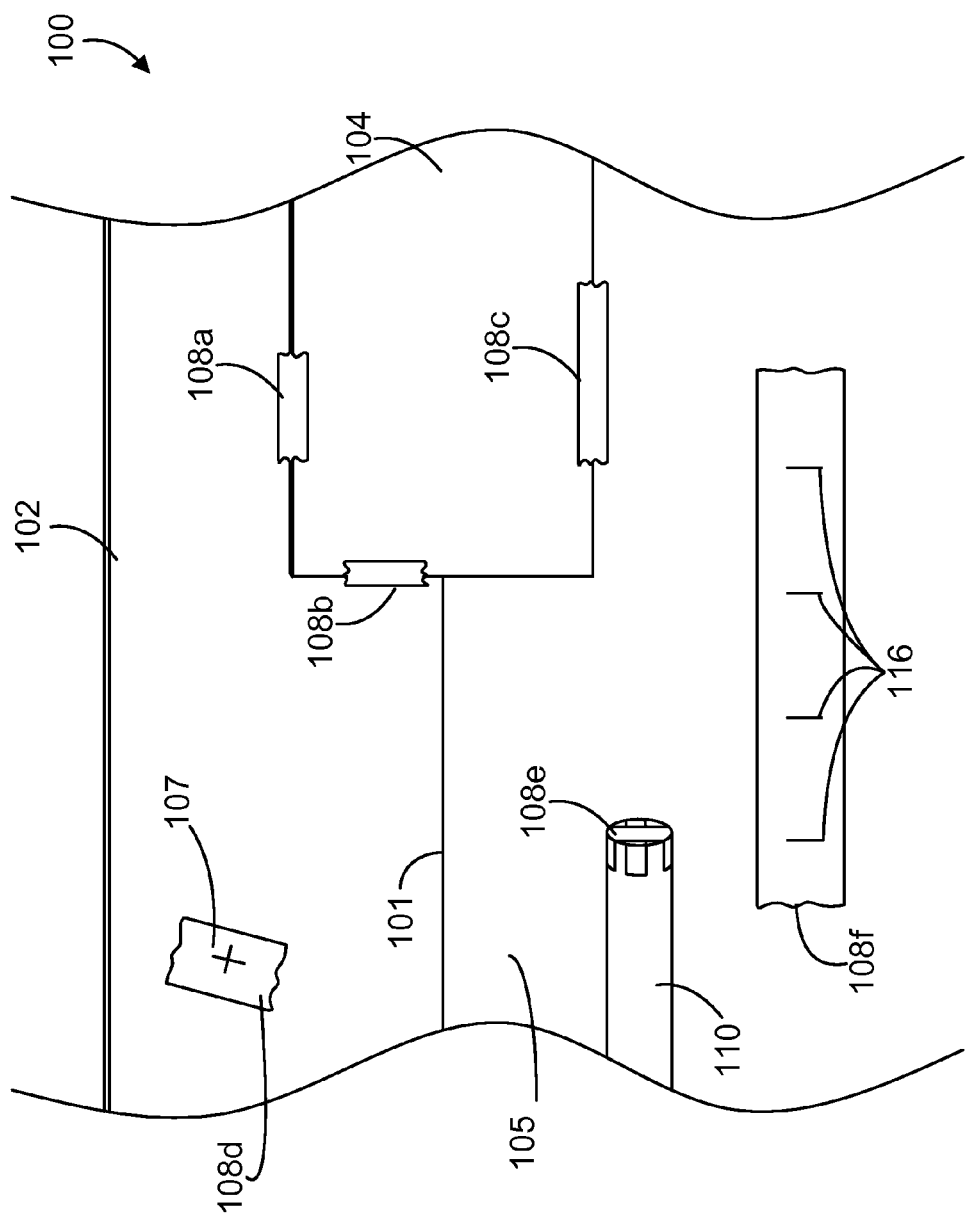
FIG. 1 illustrates various applications of a thick doped adhesive tape used in conjunction with the assembly of various parts according to various embodiments described herein.

The following detailed description is directed to systems and methods related to the use of thick doped adhesive tape in the manufacturing process of an aircraft. Although various embodiments are described in the context of assembling an aircraft, it should be recognized that the application of the invention is not limited to manufacturing aircraft per se, but can be applied to other applications where detection of unremoved adhesive tape is required using a backscatter X-ray inspection process. This includes assembly of electronic systems, propulsion systems, rockets, spacecraft components, etc. In the following detailed description, references are made to the accompanying drawings by way of illustration and various embodiments of the invention. In the drawings, like numerals represent like elements.

Aircraft manufacturing, whether it be for commercial or military airplanes, is largely a manual process involving assembling, fitting, and attaching various components or subassemblies. During this process, various different types of processes are involved. For example, components must be temporarily held in position while fasteners are attached, components must be first positioned relative to other components before assembly, or measurements relative to certain points are made and be notated.

Various uses have been found for using a commonly available adhesive tape that is beneficial during the assembly process. The adhesive tape can be one of the so-called "painter's tape" that are found in home improvement stores and are advertised frequently for use in painting applications. The tape features an adhesive that allows the tape to be readily applied to a surface and later removed. Unlike other tapes which are intended to be permanent or have a high surface bonding capability, this adhesive allows the tape to be readily and cleanly removed later without leaving an adhesive residue, without pulling out the portion of the underlying surface, and without tearing into small pieces. Once such commonly known brand of painter's tape is the blue-colored Scotch-Blue™ Multi-Surface 2090 Painter's Tape. This tape is available in various widths, ranging from at least ¾" to 3". Other brands are available having similar characteristics and features. Various brands or types of tapes also purport to have similar adhesives designed for relatively longer/shorter removal times.

Using conventional adhesive tape readily allows two parts to be positioned and affixed in place for assembly. However, the adhesive tape may not be removed and remain within the assembled parts. Detection of conventional adhesive tape can be enhanced by doping the tape to increase visibility using backscatter X-ray imaging techniques. One embodiment of using a doped adhesive tape is shown in FIG. 1, which illustrates a variety of applications, for purposes of illustrating potential uses of the doped adhesive tape. These applications are demonstrative in nature, and it should be realized that various other applications are readily possible.

In FIG. 1, three panels are illustrated. Panel 102 abuts up with a second panel 105 at seam 101, and a third panel 104 is positioned over both of these panels. This third panel 104 is held in position by three pieces of doped adhesive tape 108a-108c (this, as well as exemplars 108e and 108f, are collectively referred to as 108). The placement of the third panel 104 may be necessary as a protective covering, with the doped adhesive tape 108 utilized to hold the third panel 104 in position, while fasteners are attached for affixing the third panel 104 to the other panels 102, 105. It is readily apparent in this implementation that the doped adhesive tape 108 is used to position and hold the panel 104, and it is possible to readily re-position the panel by removing the doped adhesive tape, and reapplying the tape. If for some reason it is necessary, the doped adhesive tape 108 can be replaced with new tape. After the process is completed, the doped adhesive tape 108 can be removed and discarded.

FIG. 1 also shows another application for the doped adhesive tape. The doped adhesive tape 108d is applied to the panel 102 and marked with indicia ("+") 107. This can be marked by an assembly worker using a pen, felt marker, or pencil. The indicia can represent a position for drilling a hole, attaching a fastener, or for some other purpose. Thus, if a hole is to be drilled, the position can be manually marked without marking on the panel itself.

The doped adhesive tape 108f in FIG. 1 shows yet another application of doped adhesive tape, namely to provide markings for distances 116. This may be used to indicate positioning of other components, for drilling holes, etc. Finally, the doped adhesive tape 108e may be used as a means of protection. In this case, a tube 110 is illustrated which has an open end. During the manufacturing process, dust, dirt, shavings, and other debris may be present in the work area. Covering the end of an orifice with the doped adhesive tape is an easy way to prevent such debris from entering the orifice. Thus, if the pipe were, for example, a hydraulic line, then covering the hydraulic line opening with the doped adhesive tape can prevent debris from entering the hydraulic system. Other holes or openings can be covered for similar reasons.

Again, after completion of the assembly process, the doped adhesive tape should be removed. Removal of the doped adhesive tape after the assembly is critical. In many instances, the doped tape can be easily visually detected and then removed. However, as subcomponents are assembled into larger assemblies, pieces of doped adhesive tape which were previously readily visible may become hidden from visual inspection. Human error or oversight may result in pieces of tape remaining after assembly, which are then subsequently hidden. Since the doped adhesive tape is not part of the intended completed assembly, the doped adhesive tape is considered a foreign object. Removal of all foreign objects within the aircraft assembly is critical, since foreign objects may impede the operation of various systems and present a safety hazard. Before foreign objects can be removed, they must be identified which is referred to as a foreign object detection ("FOD") process.

One approach for foreign object detection involves using backscatter X-ray detection. This process is well known in the art and involves bombarding a surface with X-rays causing scattering of the X-rays at various angles. The scattered X-ray beam is analyzed to allow non-destructive inspection of 3-dimensional objects in completed assemblies. For reference purposes, this is referred to as a "backscatter X-ray inspection" process. After detection of the foreign objects, the foreign object item can be removed.

Figure 2:
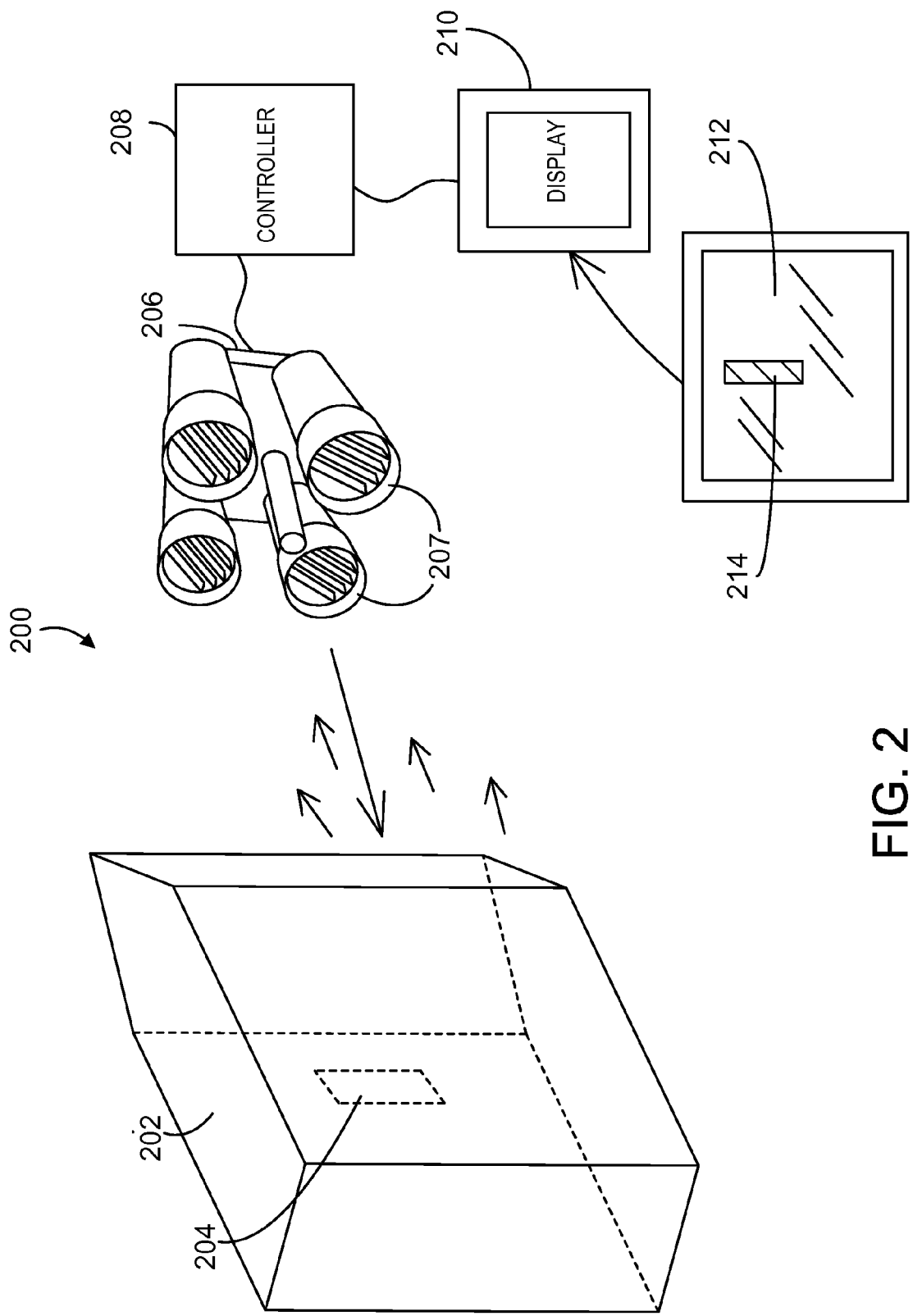
FIG. 2 illustrates one system for detecting thick doped adhesive tape remaining after assembly of components according to various embodiments described herein.

One such inspection system is illustrated in FIG. 2. The backscatter X-ray inspection system 200 of FIG. 2 diagrammatically illustrates a sub-assembly 202 having a void that is not readily visible for human inspection. The sub-assembly 202 includes a piece of adhesive tape 204 remaining within it. The sub-assembly is subjected to a backscatter X-ray inspection processing by generating an X-ray beam generated by an X-ray generator 206. The backscatter X-ray inspection device includes one or more collimator receivers 207. The collimator receivers 207 receive the scattered X-rays from the surface. Unlike many medical imaging systems, the X-rays are reflected by the objects detected, as opposed to transmitted through the objects. The control of the X-ray generator 206 and the data it receives is processed by a controller 208, which generates a display image on a computer display 210. The display image typically is a black-and-white image, and would show in this embodiment an X-ray image of the panel of assembly 212 and the tape 214. The display is visually analyzed by a technician to ascertain whether a foreign object is present, namely the doped adhesive tape. Once detected, the doped adhesive tape can be removed. Backscatter X-ray processing allows inspection of components which cannot otherwise be readily visually inspected and which would otherwise potentially have undetected foreign objects.

A backscatter X-ray inspection system 200 may be a commercially available unit, such as those manufactured by NUCSAFE™ of Oak Ridge, Tenn. The unit can be stationary, or can be attached to a robotic arm, gantry, or other movable mechanism. Such backscatter X-ray devices can potentially detect adhesive tape, but the detection of conventional painter's tape by such units is difficult because the tape itself may be made from crepe paper that is only about 5.4 mils thick (1 mil=$\frac{1}{1000}$"). Thus, the relatively low mass density of the tape (mass density=density×thickness), because of its small thickness, coupled with the high content of carbon, which has a low atomic number of 6, and relatively low density, can render detection difficult.

According to various embodiments described herein, detection of the adhesive tape by the backscatter X-ray device can be facilitated by modifying the mass density of the tape, which can be accomplished in at least two ways. In the first approach, a dopant is used that has a relatively higher density material, typically of a chemical element with a higher atomic number, that provides higher visibility to the backscatter X-ray inspection process than the materials used in conventional adhesive tape. The second approach is to make the tape thicker in addition to adding the dopant.

Changing the mass density and the subsequent Compton scattering characteristics by using a dopant increases the visibility of the adhesive tape relative to surrounding materials and structures when using the backscatter X-ray inspection process. The dopant may comprise a higher atomic number element relative to carbon, and this facilitates detection by the X-ray backscattering process because the heaver element will scatter the X-rays differently. The selection of the element added should preferably be relatively inexpensive in cost and safe to use. Thus, while gold has a heavy atomic number, its use would likely be prohibitively expensive. On the other hand, lead has a very high atomic number, but its use could pose safety hazards when handled. One compound that is relatively inexpensive, safe, and easy to incorporate into adhesive tape is iodine. Iodine has an atomic number of 53, and is commonly used for X-ray contrast imaging purposes in medical imaging. (It should be noted that medical X-ray techniques are often based on transmission of X-rays through the subject matter and are different from the back-scattering technique disclosed herein. Nevertheless, iodine is effective as a contrast agent in X-ray imaging.)

The incorporation of an iodine based dopant into the adhesive tape can occur in at least two ways. These are diagrammatically illustrated in FIG. 3A and FIG. 3B. In FIG. 3A, a side view of a section of the doped adhesive tape 300a is shown. The tape 300a comprises a backing layer comprising a paper layer 301a and an adhesive layer 303a. The adhesive layer is also referred to herein as a "sizing" and the process of applying the adhesive layer may also be referred to as "to size." In FIGS. 3A (and 3B), the thickness of the adhesive layer and the paper layer are not necessarily drawn to scale. The adhesive layer may be an acrylic or some other type. Further, the backing layer can be made of cloth, plastic, or other types of synthetic materials. As shown in FIG. 3A, this embodiment does not modify the characteristics of the adhesive as may be used in conventional painter's tapes. The paper layer 301a may be crepe paper, or based on other types of paper used for making painter's tape. However, the paper layer 301a is modified to incorporate iodine 302a, illustrated diagrammatically as dots within the paper layer. This embodiment of the doped adhesive tape adds iodine to the paper as it is being made. This results in the iodine being evenly interspersed into the paper. Then, the adhesive layer 303a may be added in a conventional manner.

Another embodiment of incorporating iodine into adhesive tape is shown in FIG. 3B. In FIG. 3B, the tape 300b in this embodiment also comprises a paper layer 301b and an adhesive layer 303b. In this embodiment, the paper does not have any iodine incorporated therein. Rather, the iodine 302b is incorporated into the adhesive layer 303b. The iodine 302b can be mixed into the adhesive prior to application to the paper, and the iodine laced adhesive may be then applied (sized) to the paper layer 301b in a conventional manner.

Other embodiments are possible in order to achieve incorporation of iodine into the adhesive tape. For example, the paper layer 301b could be sprayed with iodine, or an iodine based solution comprising potassium iodide (or other forms), onto the tape, and then the adhesive is applied onto the layer of iodine. This results in a layered structure of paper, iodine (or an iodine based compound), and adhesive. Specifically, the iodine is located between the paper and the adhesive. In another embodiment, the iodine can be applied into the adhesive layer after the adhesive layer has been applied to the paper layer. This results in a layered structure of paper, adhesive and then iodine. Other variations are possible and could be developed by those skilled in the art.

A process for manufacturing iodine doped adhesive tape is shown in FIG. 4. The process 400 is shown as a series of operations beginning with forming a paper pulp slurry in operation 402. In one embodiment, iodine, potassium iodide, or other iodine based additives are added to the slurry in operation 404. This results in incorporation of iodine into the paper itself. Mixing of the solution then facilities even distribution of the iodine into the paper slurry. The slurry is then processed in operation 406 by a paper processing machine, which forms the crepe paper (or other type of paper), used as the paper layer in the adhesive tape. In one embodiment, the slurry is passed over a heated rotating drum semi-solidifying the slurry paper, and the semi-solid paper is scraped off the drum using a large blade as it rotates and dried to create a continuous paper sheet 408. The thickness can be controlled in part on the speed of rotation, the slurry mixture, and the heat. Other factors may be involved. After drying, the result is a continuous paper sheet 408, which is then sized in operation 410. Operation 410 involves application of the sizing (e.g., liquid adhesive) onto the tape, which can occur by spraying, depositing, or otherwise applying the adhesive onto one side of the paper. The addition of the adhesive at operation 412 may have iodine incorporated into the sizing. If so, this produces the doped adhesive layer on the paper. From there, operation 414 cuts the tape to the desired width, rolls, and packages it. The result is the doped adhesive tape 416.

As shown in FIG. 4, the addition of iodine at operation 404 and operation 412 is optional. The iodine may be added into 1) the paper slurry (to produce iodine in the paper layer), 2) the sizing (to produce iodine in the adhesive layer), or 3) a combination of both. The amount of iodine added varies, and can depend on the thickness of the paper layer and whether iodine is added to both the paper and the sizing. If the paper layer is made thicker (e.g., relative to current painter's tape), and iodine is added to both the paper and the adhesive, then this will produce the most easily detectable tape by the backscatter X-ray detection technique. A slightly less detectable tape can be produced by making a thicker paper layer with iodine added to only one of the paper or the adhesive. Depending on the thickness of the paper and the amount of iodine added, this arrangement may be acceptable for detecting the doped adhesive tape.

The other approach previously identified for increasing the mass density is to make the doped adhesive tape thicker. In one embodiment, the paper used in the adhesive tape is made about 100 mils thick (0.1") (e.g., within 80-120 mils). In other embodiments, the tape can be made thinner, e.g., at least 20 or 50 mils, or even thinner based on the relative level of doping applied. The tape can be made thicker, but there are practical considerations regarding making the tape thicker, including the increased costs of manufacturing and handling.

Assuming that the paper used in conventional adhesive tape has a density of 250 kg/m$^3$ or 0.009 lbs./in$^3$, then a 1 square inch of this paper would have a mass density be provided by the following equations (1a-1c):

$$\text{Mass density} = \text{density} \times \text{thickness} \quad (1a)$$

$$\text{Mass density} = 0.009 \text{ lbs./in}^3 \times 0.005 \text{ in} \quad (1b)$$

$$\text{Mass density} = 0.000045 \text{ lbs./in}^2 \quad (1c)$$

If however, the thickness is increased to 100 mils, then equations 2a-2b provide for the mass density:

$$\text{Mass density} = 0.009 \text{ lbs./in}^3 \times 0.1 \text{ in} \quad (2a)$$

$$\text{Mass density} = 0.0009 \text{ lbs./in}^2 \quad (2b)$$

The thicker tape increases the mass density by 20 times (which is derived by dividing equation 2b by equation 1c). Since the ability to detect the tape varies linearly with respect to its mass density, this thicker tape will be 20 times more detectable using the backscatter X-ray inspection process. This example shows the improved detectability by thickening the tape, but it is not practical to have a very thick tape owing to considerations cited previously.

The amount of required dopant, such as iodine, to be added into paper slurry or adhesive can be estimated using the following calculations. Assuming that the major chemical element in the paper is carbon, that has an atomic number 6, and the atomic number of iodine is 53. Using the combined atomic number of 59 and weighted factors, the carbon contributes 6/59 or about 10% of overall detectability and the iodine contributes 53/59 or about 90% of overall detectability. Therefore, in one embodiment the portion ratio of paper slurry to iodine is 9 to 1. That is, 9 parts of paper slurry to 1 part of iodine.

Similarly, it is assumed that the major chemical element in the adhesive is hydrogen which has an atomic number 1. The adhesive contributes 1/54 or about 2% of overall detectability and the iodine contributes 53/54 or about 98% of overall detectability. Therefore, the portion ratio of adhesive to iodine is 9.8 to 0.2. Therefore, in one embodiment the portion ratio is 9.8 parts of adhesive to 0.2 part of iodine, which is equivalent to 49 parts adhesive to 1 part iodine.

The above examples provide the guidelines for the amount of required dopant, such as iodine, in paper slurry and adhesive in one embodiment. It is believed that more dopant would further enhance the detectability. Other embodiments may use other ratios depending on other factors.

Other variations are possible. In another embodiment, the paper layer may remain the same thickness as conventional paper tape, and a greater concentration of iodine may be added to the paper, the adhesive, or both. Depending on the application, this arrangement may be sufficient to enhance the detectability of the tape by the X-ray detection technique. Further, the detectability of the doped adhesive tape is relative to the materials being inspected. For example, doped tape may be used to assemble plastic or metal parts. The amount of doping, how it is applied, and the thickness of the paper required to facilitate detection using the backscatter X-ray process may vary based on whether plastic of metal parts are being inspected. Thus, it may be sufficient in some embodiments to merely apply a dopant to the adhesive of the paper used in a conventional painter's tape (about 5.4 mils). The reference to "doped adhesive tape" herein should not be interpreted as limiting the resulting tape to a particular manufacturing process, or to one of the embodiments described above.

The dopant disclosed herein is iodine, and it could be in the form of a suitable concentration of potassium iodide dissolved in water or other suitable carrier. Other iodine based compounds could be used. Further, other compounds may be substituted in lieu of, or added with, iodine to form the dopant that provides a relatively opaque effect using the backscatter X-ray backscattering inspection process. For example, bromine and chlorine have similar atomic numbers as iodine, but these elements can be hazardous or expensive in various forms. It is desirable, but not necessary, that whatever compound is used as the dopant that it is safe and inexpensive. Thus, some elements which may be effective for detection, may not be preferred because they are highly reactive or costly.

Once the doped adhesive taped is produced, its use is detailed in the process flow of FIG. 5. FIG. 5 discloses a process 500 for using the doped adhesive tape in an industrial assembling process, which does not necessarily have to be limited to assembling an aircraft. In operation 502, the doped adhesive tape is applied to the components as appropriate. This may include, but is not limited to any of the aforementioned applications. In operation 504, any necessary assembly related task is then performed. This may be positioning the component relative to another, marking a location or distance on the tape, covering an orifice, etc. Typically, at some point subsequent to the assembly operation the tape should be removed, but this may not always occur.

However, as noted, the doped adhesive tape may be inadvertently left on the applied components. In operation 506, inspection for foreign object debris is performed using the backscatter X-ray inspection technique. At operation 508, detection of the tape is facilitated by the doped nature of the tape as described above. If the tape is detected, then operation 510 occurs and the tape is removed. If no tape is detected, then the process is completed at operation 512.

The above disclosure has illustrated the concepts based on using a paper-based doped adhesive tape. However, the above concepts and principles are not limited to using only a paper-based tape, but can be applied to tapes where the backing material is made from other non-paper materials. Thus, adhesive tapes where the backing material is made from cloth, plastic, foam, or other types of materials can benefit from the above concepts. Specifically, a cloth or plastic backing can either be made that incorporate a dopant into the backing itself, or has the doped adhesive applied thereto.

The subject matter described herein is provided by way of illustration only and should not be construed as limiting. Various modifications and changes may be made to the subject matter described herein without exactly following the example embodiments and applications illustrated and described, and without departing from the true spirit and scope of the present disclosure, which is set forth in the following claims.

The invention claimed is:

1. A method for using doped adhesive tape comprising:
    applying the doped adhesive tape to a first component being assembled, wherein the doped adhesive tape comprises a dopant facilitating detection by a backscatter X-ray inspection process;
    assembling the first component with a second component; and
    subjecting the assembled first component and the second component to the backscatter X-ray inspection process.

2. The method of claim 1, further comprising:
    determining that the doped adhesive tape is present on the first component; and
    removing the doped adhesive tape from the first component in response to determining that the doped adhesive tape is present on the first component.

3. The method of claim 2, wherein the doped adhesive tape is not readily visible after the first component and the second component have been assembled.

4. The method of claim 3, wherein the tape is of a thickness greater than 20 mils.

5. The method of claim 3, wherein the dopant comprises iodine.

6. The method of claim 3, where determining that the doped adhesive tape is present on the first component involves visually analyzing an X-ray image of the first component using a backscatter X-ray inspection device.

* * * * *